Nov. 23, 1965         H. B. WEBER         3,218,990
CAR TRUCK SIDE FRAME WITH SNUBBING MEANS
Filed Nov. 13, 1962

INVENTOR.
HANS B. WEBER
BY Henry Hozak
ATTORNEY

United States Patent Office 3,218,990
Patented Nov. 23, 1965

3,218,990
CAR TRUCK SIDE FRAME WITH
SNUBBING MEANS
Hans B. Weber, Bedford, Ohio, assignor, by mesne assignments, to Midland-Ross Corporation, Cleveland, Ohio, a corporation of Ohio
Filed Nov. 13, 1962, Ser. No. 237,016
2 Claims. (Cl. 105—207)

This invention relates to a new and improved railway car truck providing for the rapid and facile assembly of the truck.

Railway freight car trucks are currently designed and built with a friction snubbing means between the side frame and bolster of the truck. The assembly of the truck is presently considered to be unduly complicated and time-consuming by the difficulty in inserting the friction snubbing means in the side frame. The invention herein disclosed overcomes this difficulty by providing the side frame and friction wedge with carefully positioned openings which facilitate the retracting and securing of the friction wedge and wedge spring into a position for admitting the bolster into the side frame. A frequent error made during the assembly of a truck is to insert the friction wedge in the pocket incorrectly. This is a frequent mishap when the wedge is substantially symmetrical in shape. The invention herein disclosed not only enables the truck to be rapidly assembled, but prevents incorrect assembly as well.

It is therefore the primary object of this invention to provide means on a car truck enabling the truck to be rapidly and correctly assembled.

It is a specific object of this invention to provide a side frame with openings therein that enable the friction snubbing means to be readily inserted into the wedge pocket of the side frame.

Another specific object is to provide openings in the side frame of a car truck to aid in the compression and retention of the snubbing means, and to provide the friction wedge with flange means thereon to preclude incorrect assembly of the truck.

The objects of this invention are achieved in a car truck side frame having a tension member, a compression member, and a vertical column arranged to provide a bolster opening and a friction wedge pocket in the column. The column has side walls and a rear wall which form the pocket in a shape tapering toward a smaller end. The side frame further comprises a friction wedge normally positioned in the pocket, and resilient means acting along an axis in approximately fixed relation with the frame for urging the wedge into operative position against the rear wall of the pocket and a side surface of a bolster normally positioned in the bolster opening.

The improvement provided by the invention results essentially in the arrangement of openings for using a pry bar to force the wedge into a retracted position and hold it there by a pin. For example, one of the side walls has a pry bar-receiving opening centered generally along a transverse plane of the side frame containing the axis of the resilient means, and a pin-receiving opening spaced underneath the bar-receiving opening to one side of the transverse plane. The column, for example, provides another bar-receiving opening in subjacent relation with the pocket and contiguous relation with the bolster opening.

The invention described below with respect to the accompanying drawing, in which.

Figure 1:
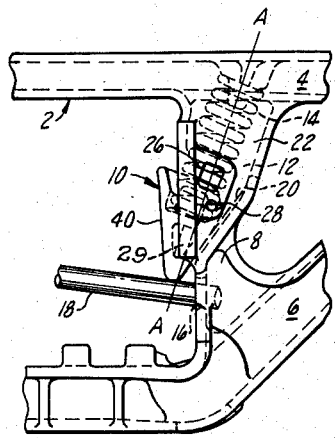
FIG. 1 is a fragmentary side view of a side frame of a car truck embodying the invention with the spring actuated bolster-snubbing means fully extended.

Referring to FIG. 1 there is shown a portion of a side frame 2 having a compression member 4, a tension member 6, and a vertical column 8. A friction wedge 10 is positioned just within the wedge pocket 12 with the wedge spring 14 at its free uncompressed height. In assembling a car truck, it is necessary to enter the wedge sufficiently into the wedge-pocket 10 of the side frame column to dispose it completely out of the bolster opening. Such disposition of the wedge permits a bolster to be entered into and through the opening of the frame therefor and requires that the spring 14 be correspondingly compressed. The spring 14 is capable of exerting a force not readily overcome by one man. Thus, some mechanical aid must be employed. The invention herein disclosed resides in part in providing the vertical column 8 with an opening 16 in which the end of a conventional pry bar 18 may be inserted.

An important consideration in this invention resides in the location of the longitudinal axis of the spring 14. In FIGS. 1–4 the longitudinal axis of the spring 14 is marked by line A—A. This line also marks the longitudinal axis of the pocket 12 and indicates as well a transverse plane containing the axis of the pocket and the spring. It should be noted that the spring 14 exerts force primarily along this line when the wedge engages the bolster in working position. When extended downwardly, this force line crosses the pry-bar 18 at a point between the bar's contact with the frame surface along the lower periphery of opening 16 and the initial contact of the bar with the top of the wedge 10. With the force line being so positioned, the wedge and wedge spring, when compressed by the pry bar 18, is urged against the rear wall 20 of the pocket 12. The side walls 22, 24 of the pocket serve merely to preclude lateral displacement of the wedge. The side wall 22, most clearly seen in FIGS. 1–4, is characterized by the pry bar opening 26 and a retaining-pin hole 28. The retaining-pin hole 28 is located in a position laterally offset from a plane which bisects the wedge pocket, is perpendicular to the general plane of the frame, and contains the longitudinal center line A—A. The location of the hole 28 in conjunction with an opening 29 in the side of the wedge 10 constitutes an important feature of this invention.

Figure 2:
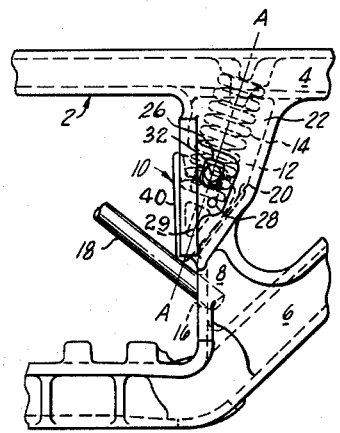
FIG. 2 is a fragmenary side view of the side frame with the snubbing means partially compressed.
Figure 3:
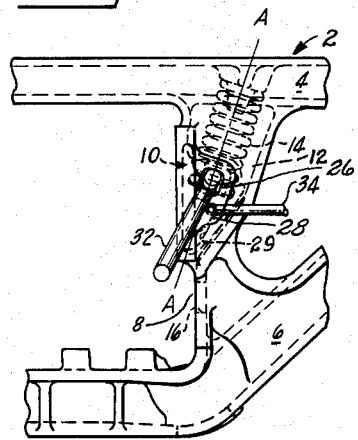
FIG. 3 is a fragmentary side view of the side frame with the snubbing means fully compressed.

To assemble the truck, the wedge is placed in a position against the pocket wall 20 as shown in FIG. 1. The end of the pry bar 18 is inserted into the opening 16 in the vertical column 8. At this point in the assembly of the truck, the spring 14 is fully extended. The end of the pry-bar, as shown in FIGS. 1–3, is then raised by the operator. Thus, a surface within the opening 16 serves as a fulcrum for the lever or bar 18 in compressing the spring 14. The wedge 10 then is forced into the pocket and the spring is compressed to the extent shown in FIG. 2. As a consequence, the opening 30 of the wedge is brought into registry with the opening 26 in the side wall 22. As shown in FIG. 2, another pry bar 32 can now be inserted through these two openings which is then used in a second stage of prying the wedge upwardly to further compress the spring 14 until the wedge reaches the position illustrated in FIG. 3. This latter step brings the upper part of the wedge opening 29 in registry with the retaining-pin hole 28.

FIG. 3 shows the spring 14 sufficiently compressed by the pry bar 32 to enable the retaining-pin 34 to be inserted into the opening or hole 28 of the side frame. The sole function of the pin is to hold the wedge in the retracted position to enable entry of the bolster into, or its withdrawal from, the frame opening therefor.

Figure 4:
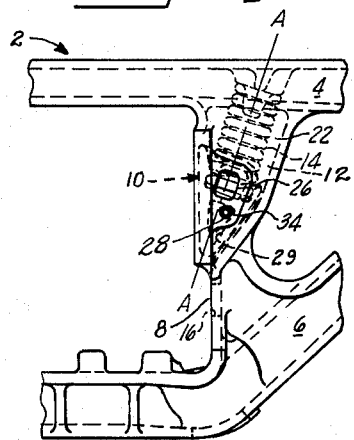
FIG. 4 is a fragmentary side view of the side frame with the snubbing means pinned in the retracted position.
Figure 5:
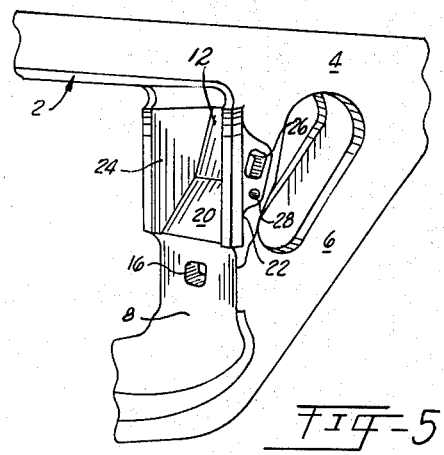
FIG. 5 is a fragmentary perspective view of a portion of a side frame partially embodying the invention.

In FIG. 4 the retaining-pin 34 is shown inserted in opening 28 and holding the wedge in its fully retracted position as attained through the use of the pry bar 18 and the pry bar 32 as described above. With the wedge held in this retracted position, the truck assembly can be readily completed according to presently employed practices.

Figure 6:
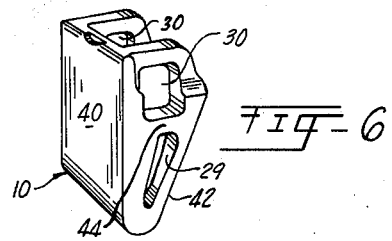
FIG. 6 is a perspective view of a friction wedge partially embodying the invention.

FIG. 6 illustrates the friction wedge 10 in a form providing a flat friction surface 40 adapted for engagement with a normally vertical complemental surface of the bolster, and a rear wall 42 providing a slightly curved surface adapted for rocking engagement with the rear wall 20 of the pocket. The lateral extremities of the wall providing the friction surface 40 and the wall 42 are joined by an end wall or web 44 across the side of the wedge normally in juxtaposition with the lateral pocket wall 22. The web 44 defines the opening 29 and locates it generally to one side of a plane bisecting the angle between the surface 40 and the outer surface of the wall 42. Otherwise, the wedge could be constructed almost symmetrical. When of a nearly symmetrical construction, the wedge must be properly placed in the pocket in order for the opening 29 to be used in conjunction with the hole 28. The opportunity for incorrectly inserting the wedge in the wedge pocket occuring with conventional side frames is thus effectively avoided.

Referring now to FIGS. 1-4, the position of the pin retaining hole 28 is obviously laterally offset from the bisecting plane along line A—A of the pocket. If the wedge is incorrectly inserted into the pocket, a pair of pry bars can be employed to compress the spring 14, but the web 44 will be in registry with the opening 28 in the side wall 22 and thus prevent insertion of the pin 34. However, when the wedge is placed in the pocket with the wall 42 against the pocket wall 20, the opening 29 becomes horizontally aligned with the hole 28 at the position shown in FIG. 4.

Thus, the openings 16 and 26 in the vertical column 8, and the pin-receiving apertures 28 and 29 of the column and wedge, respectively, provide for rapid positioning of the wedge as a preliminary step in quick assembly of the truck. The web 44 on the wedge 10 prevents the incorrect assembly of the friction snubbing means because an operator simply finds that the wedge may not be secured in retracted position unless properly oriented in the pocket 12. It would be possible to use other locations of the apertures 28 and 29 and still enable the truck to be rapidly assembled. However, the location of apertures 28 and 29 is found to be advantageous over other locations because the force pattern involving the pressure of the spring 14 and the resistance provided by the pin 34 minimize the tilting of the wedge out of flush relation with the columns into the bolster opening. Other locations of apertures 28 and 29 favor tilting of the wedge into possible interference with movement of the bolster into and out of the frame.

From the foregoing it should be apparent that this invention may be applied to a broad range of snubbed car trucks and its not limited to its application to trucks having the particular truck parts illustrated. It would be possible, as an example, to have a car truck with an upwardly urged friction-wedge employ the invention with equal facility.

What has been disclosed is an improvement to existing car trucks that permits existing trucks to be modified to incorporate the features of this invention as well as to have new trucks incorporate the invention herein disclosed.

The terms and expressions which have been employed are used as terms of description and not of limitation and there is no intention of excluding such equivalents of the invention described or of the portions thereof that fall within the scope of the claims.

What is claimed is:
1. A combination comprising:
 (A) a side frame for a railway car having a tension member, a compression member, and a vertical column arranged to provide a bolster opening, said column having side walls and a rear wall portion end;
 (B) a friction wedge normally positioned in said pocket, and having converging walls and end walls connecting the converging walls;
 (C) resilient means disposed between a portion of the frame and a wedge, and centered in approximately fixed relation with the frame along a transverse plane containing its longitudinal axis and approximately bisecting the dihedral angle formed by the wedge pocket to urge the wedge into an operative position against the rear wall of the pocket and a side surface of the bolster normally positioned in said bolster opening;
 (D) said frame having a first pry-bar receiving opening centered in one of said side walls and along said plane, a pin-receiving hole centered in said side wall at one side of said transverse plane, and a second pry-bar receiving opening in said column along a surface that faces into the bolsted opening exteriorly of but adjacent to said smaller end of the pocket;
 (E) said wedge, at a position of retraction from the bolster opening into said pocket, having an angle between said converging sides approximately bisected by said plane, a pry-bar opening, and a pin-receiving hole in an end wall disposed to one side of said bisecting plane, the pry-bar opening being centrally between the converging sides;
 (F) at said position of retraction, said wedge having said pry-bar receiving hole and said pin-receiving hole in registry with said first-named opening and the first-named hole, respectively; and
 (G) the end walls of the wedge having portions on the opposite side of said bisecting plane in juxtaposition with, and closing off, said pin-receiving hole of the side wall when said converging walls are reversed with respect to the bolster, said rear wall, and said operative position.

2. The combination of claim 1 wherein: said pin receiving holes, at said retracted position of the wedge, are disposed in respect to said pry bar receiving openings of the side wall and the wedge at the side of said transverse plane toward the rear wall and toward the smaller end of the pocket.

References Cited by the Examiner
UNITED STATES PATENTS

| | | | |
|---|---|---|---|
| 2,650,550 | 9/1953 | Pierce | 105—197 |
| 2,705,925 | 4/1955 | Leese | 105—197 |
| 2,712,796 | 7/1955 | Shafer | 105—197 |
| 2,908,232 | 10/1959 | Baselt | 105—197 |

ARTHUR L. LA POINT, *Primary Examiner.*

LEO QUACKENBUSH, *Examiner.*

UNITED STATES PATENT OFFICE
CERTIFICATE OF CORRECTION

Patent No. 3,218,990 November 23, 1965

Hans B. Weber

It is hereby certified that error appears in the above numbered patent requiring correction and that the said Letters Patent should read as corrected below.

Column 3, line 65, for "and its not limited to its" read -- and is not limited in its --; column 4, line 16, before "end" insert -- defining a wedge pocket tapering toward its lower --; line 34, for "bolsted" read -- bolster --; line 44, for "hole" read -- opening --.

Signed and sealed this 2nd day of August 1966.

(SEAL)
Attest:

ERNEST W. SWIDER
Attesting Officer

EDWARD J. BRENNER
Commissioner of Patents